(12) United States Patent
Nedelman

(10) Patent No.: US 9,718,416 B2
(45) Date of Patent: Aug. 1, 2017

(54) AUTOMOTIVE HEADLINER LOCATOR TAB FOR SERVICE REPAIR

(71) Applicant: FORD GLOBAL TECHNOLOGIES, LLC, Dearborn, MI (US)

(72) Inventor: Marc David Nedelman, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/930,138

(22) Filed: Nov. 2, 2015

(65) Prior Publication Data

US 2017/0120843 A1    May 4, 2017

(51) Int. Cl.
*B60R 13/02* (2006.01)
(52) U.S. Cl.
CPC ...... *B60R 13/0212* (2013.01); *B60R 13/0218* (2013.01); *B60R 2013/0293* (2013.01)
(58) Field of Classification Search
CPC ............ B60R 13/0212; B60R 13/0218; B60R 13/0225
USPC .................................................. 296/1.08, 214
See application file for complete search history.

(56) References Cited

U.S. PATENT DOCUMENTS

| | | |
|---|---|---|
| 5,795,015 A | 8/1998 | Corpe et al. |
| 6,491,339 B2 | 12/2002 | Flores |
| 6,575,527 B1 | 6/2003 | Bishop, Jr. |
| 2011/0278872 A1* | 11/2011 | Eidt ................... B29C 63/0034 296/1.08 |
| 2013/0285419 A1* | 10/2013 | Lizak ................. B60R 13/0212 296/214 |
| 2014/0265449 A1 | 9/2014 | Davis |
| 2014/0265456 A1 | 9/2014 | Huelke |

* cited by examiner

*Primary Examiner* — Jason S Daniels
(74) *Attorney, Agent, or Firm* — Vichit Chea; King & Schickli, PLLC

(57) ABSTRACT

A replacement locator tab is provided for a headliner. That replacement locator tab includes a locator portion and a headliner mounting portion. An adhesive film is provided on a face of the headliner mounting portion. A removable protective film overlies the adhesive film. A headliner incorporating the locator tab is also disclosed as is a method of repairing a headliner in a motor vehicle.

18 Claims, 9 Drawing Sheets

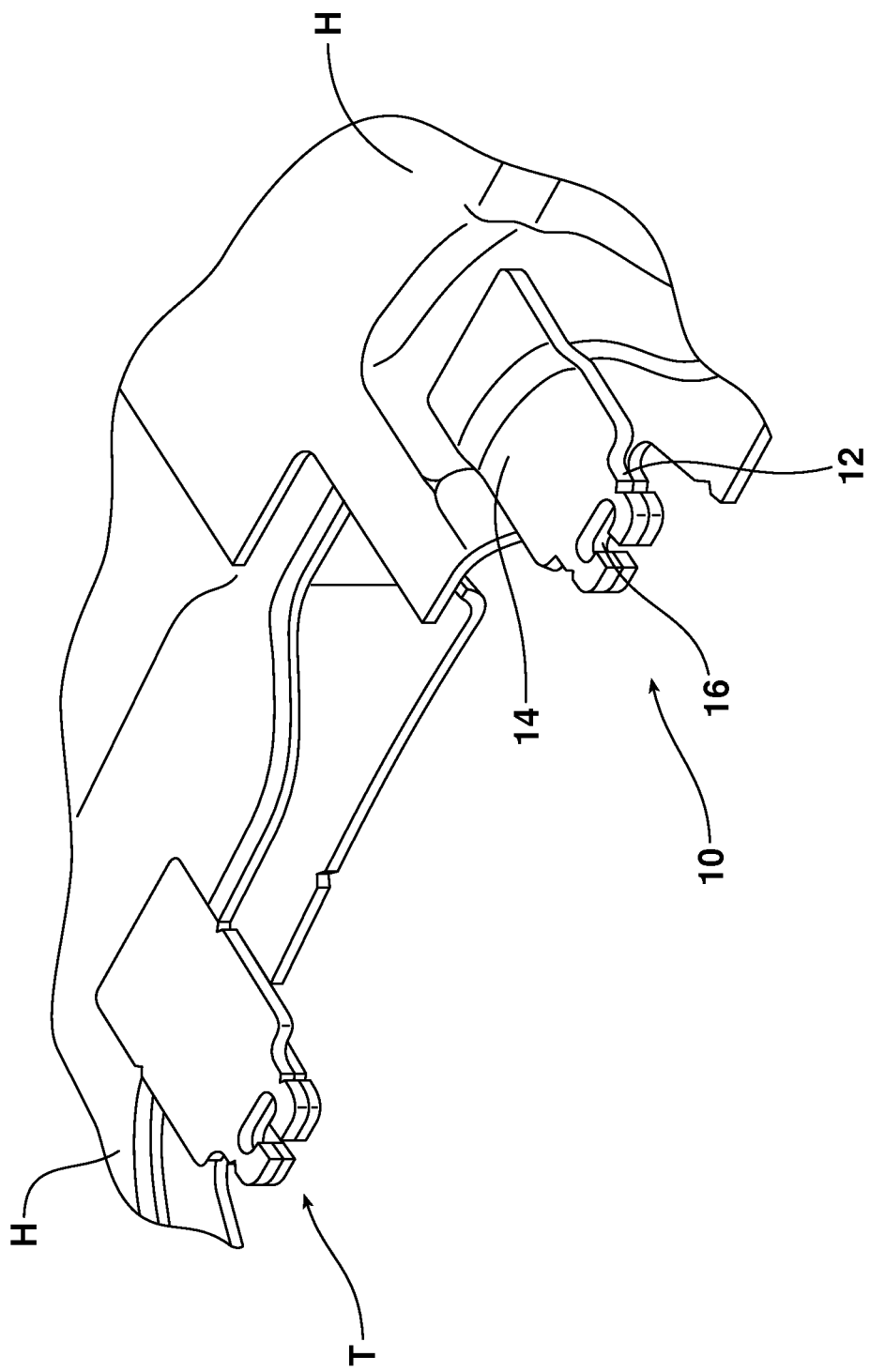

AUTOMOTIVE HEADLINER LOCATOR TAB FOR SERVICE REPAIR

TECHNICAL FIELD

This document relates generally to the motor vehicle equipment field and, more particularly, to a replacement tab for a headliner, a headliner for a motor vehicle incorporating a locator tab attached with an adhesive and a method of repairing a headliner in a motor vehicle.

BACKGROUND

During installation of a headliner in a motor vehicle, the installer must engage locator tabs on the headliner with coordinating pillar block pins. The proper engagement between these features maintains fit between the headliner and the pillar trim panels ensuring proper alignment between parts with no gapping present. Occasionally during this installation process headliner locator tabs become misaligned with the coordinating pillar block pins resulting in a damaged headliner. Further, when misalignment between these features occurs the locator tab often stands off on the pillar ramp pin which has a tendency to push the headliner inboard in vehicle. This can result in gapping between the pillar trim panels and the headliner and an overall poor appearance of the headliner. When returned for repair one or more of the locator tabs are often found to be torn, bent and/or deformed. In the past this necessitated the replacement of the affected headliner.

This document relates to a replacement tab for a headliner and a new method of repairing a headliner in a more cost effective manner not requiring headliner replacement. Thus, a significant advance is made in the art.

SUMMARY

In accordance with the purposes and benefits described herein, a replacement tab is provided for a headliner. That replacement tab comprises a locator portion and a headliner mounting portion. In addition an adhesive film is provided on a face of the headliner mounting portion. Still further, a removable protective film overlies the adhesive film.

In one particularly useful embodiment, the locator portion and the headliner mounting portion of the replacement tab are made from cross-linked polyethylene. Further the adhesive film is a butyl adhesive film.

In accordance with an additional aspect, a headliner is provided for a motor vehicle. That headliner comprises a headliner body and a locator tab secured to the headliner body. That locator tab includes a locator portion and a headliner mounting portion. Further the locator tab includes an adhesive film on a face of the headliner mounting portion for securing the locator tab to the headliner body. The locator portion and the headliner mounting portion of the replacement tab are made from cross-linked polyethylene. The adhesive film is a butyl adhesive film. In another possible embodiment, the headliner further includes a tape strip overlying the mounting portion of the locator tab.

In accordance with an additional aspect, a method is provided for repairing a headliner in a motor vehicle. That method may be broadly described as including the steps of cutting a locator tab from the headliner, connecting a new locator tab to the headliner and securing the new locator tab to a pillar block pin of the motor vehicle.

More specifically, the method first includes removing a trim pillar panel so as to uncover the locator tab headliner. Next the method includes identifying any locator tab on the headliner that is torn, deformed or damaged and does not properly engage with a pillar block pin. This is then followed by cutting any locator tab so identified from the headliner and replacing all cut locator tabs with a new locator tab. Next, any new locator tab is aligned with a pillar block pin of the motor vehicle.

The new locator tab is connected to the headliner by an adhesive. More specifically, the method includes removing a protective film from an adhesive film covering a mounting portion of the new locator tab before adhering a new locator tab to the headliner. Next, in certain embodiments, the method includes further securing the new locator tab to the headliner with a tape strip. Finally the method includes replacing the trim pillar panel after securing a new locator tab to the pillar block pin of the motor vehicle.

In the following description, there are shown and described several preferred embodiments of the replacement locator tab, the headliner and the related method of repairing a headliner in a motor vehicle. As it should be realized, the replacement locator tab, headliner and method are capable of other, different embodiments and their several details are capable of modification in various, obvious aspects all without departing from the tab, headliner and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the replacement locator tab, the headliner and the method of repairing a headliner in a motor vehicle and together with the description serve to explain certain principles thereof. In the drawing figures:

FIG. 2 is a perspective illustration clearly showing how a replacement locator tab made from cross-linked polyethylene conforms to the backside of headliner topography to a far greater degree than such a locator tab made from typical headliner material.

Reference will now be made in detail to the present preferred embodiments of the replacement locator tab, headliner and method, examples of which are illustrated in the accompanying drawing figures.

DETAILED DESCRIPTION

Figure 1:
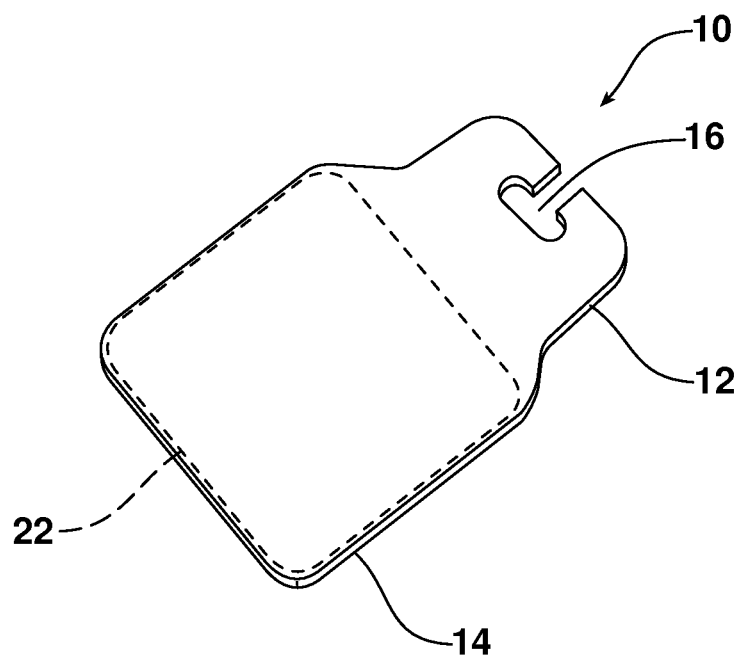
FIG. 1 is a perspective view of a replacement locator tab clearly illustrating the locator portion and the headliner mounting portion.
Figure 1A:
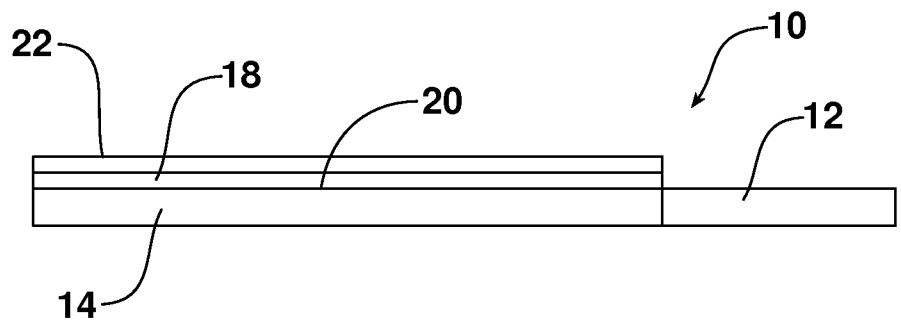
FIG. 1a is a cross-sectional view of the replacement locator tab illustrated in FIG. 1 clearly illustrating the body of the locator tab, the adhesive film on a face of the headliner mounting portion of that locator tab and the protective film overlying that adhesive film.

Reference is now made to FIGS. 1 and 1a illustrating the replacement locator tab 10 which includes a locator portion 12 and a headliner mounting portion 14. As illustrated, the locator portion 12 includes a keyhole opening 16 that is adapted to be secured over a pillar block pin of the motor vehicle in a manner that will be described in greater detail below. A layer of adhesive film 18 is provided on a face 20 of the headliner mounting portion 14. A protective film 22 overlies the adhesive film 18.

Many motor vehicles today are equipped with overhead air curtain systems. Such systems are typically located behind the headliner and are mounted to the side roof rails. Changes to the headliner geometry can potentially affect performance of the air curtain when deployed. In a particularly useful embodiment, the body of the replacement locator tab 10, comprising both the locator portion 12 and the headliner mounting portion 14, is die cut from a single piece of cross-linked polyethylene (XLPE). Such a material provides the desired strength to maintain fit between the affected components. It is also pliable enough to allow the air curtain to deploy without creating any obstruction or interference. Other attributes associated with the usage of cross-linked polyethylene is its ability to conform to the surface topology along the back side of the headliner as well as its ability to flex should the pillar block pin become dislodged from the keyhole opening 16 and thereby avoiding gapping between the headliner and the pillar trim panel.

More specifically, as illustrated in FIG. 2, a locator tab T made from typical headliner materials such as dry P.U.; GMT, is rigid and does not comply with the surface topography of the headliner H. This results in a skewed mount profile along with limiting surface contact for adhesion. In contrast, the replacement locator tab 10 made from XLPE is flexible and conforms to the backside of the headliner topography optimizing adhesion and mounting. This also eliminates any need for the repair technician to trim the locator tab 10 to fit.

In one particularly useful embodiment the adhesive film utilized is a butyl adhesive film. This use of a PSA butyl adhesive film is a unique aspect. The majority of components attached to the backside of a headliner H are normally bonded using a hot melt adhesive, as most other bonding methods do not adhere to the felt-like surface of the headliner substrate scrim cloth. The butyl (peel-and-stick) adhesive used in conjunction with the XLPE replacement locator tab 10 is a non-typical solution that testing has proven to work for this application. The following tests show an average side pull force of 57.81# which is equivalent to the side pull requirements of the hot melt adhesive:

Force gage speed set at 300 mm/min, readings in pounds of force.
Samples applied to Wet P.U. substrate material.
180 deg. Peel test results (Sample size 1"×8"×⅛")
1) 11.15
2) 7.67
3) 13.99
4) 13.22
5) 10.49
 11.30# avg.
Side pull test results (Sample test area 1½"×1¼"×⅛")
1) 59.34
2) 58.26
3) 54.54
4) 57.98
5) 58.92
 57.81# AVG.

As will be described in greater detail below when mounting the replacement locator tab 10 to the headliner the protective film 22 is removed, exposing the adhesive film 18 for adhesively bonding the replacement tab to the headliner. By providing the replacement locator tab 10 with an integral adhesive film 18 the time allocated for the headliner repair is greatly reduced further enhancing cost efficiency associated therewith. The integral adhesive film 18 also avoids any usage of a squeeze out adhesive that is often messy and requires significant cure times before the headliner and thus, the motor vehicle, can be returned to service.

Figure 3A:
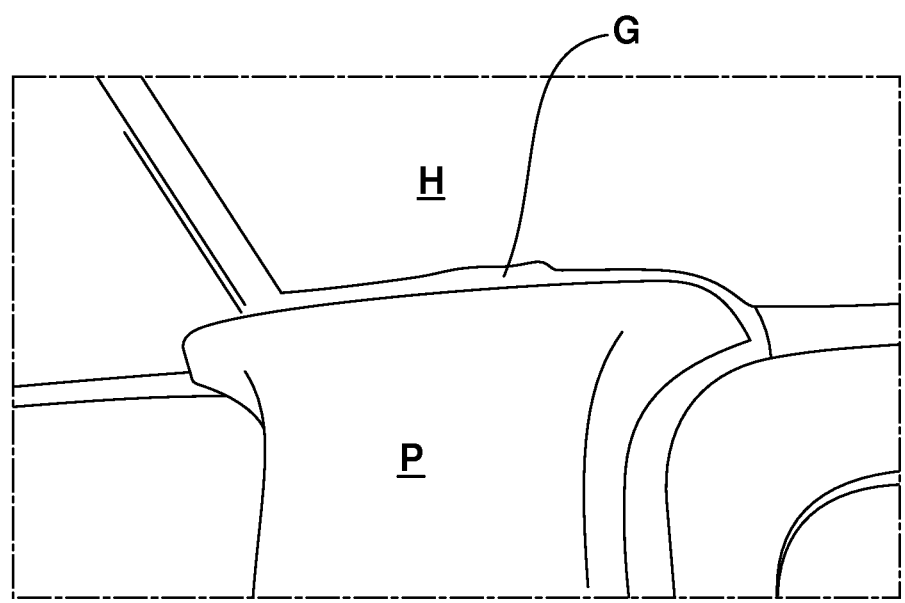
FIGS. 3a-3g are a series of figures illustrating the method of repairing a headliner in a motor vehicle.
Figure 3B:
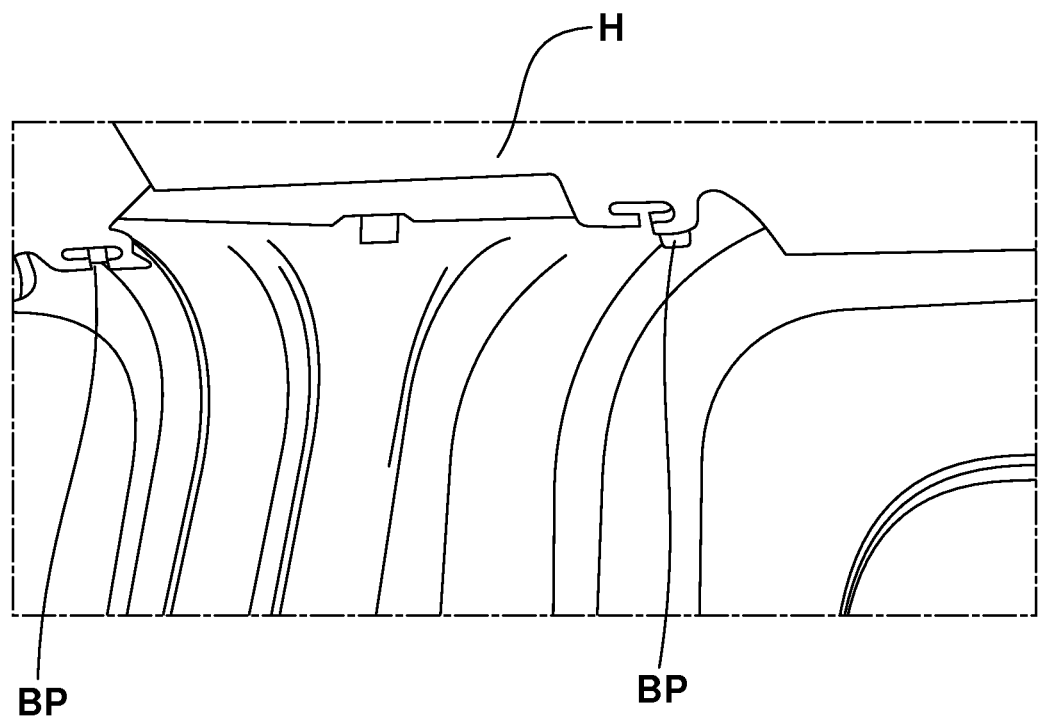
Figure 3C:
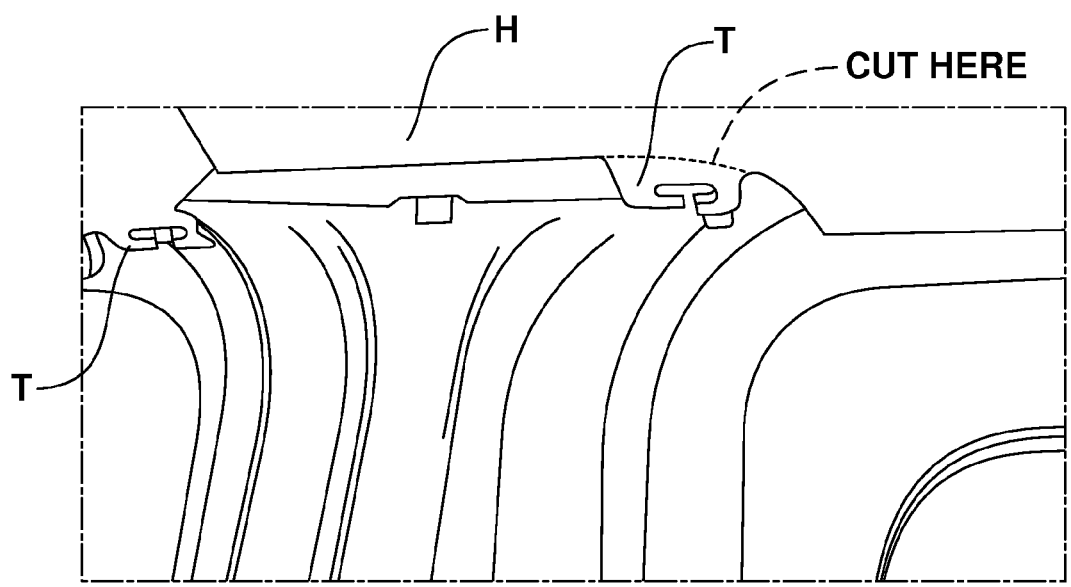

Reference is now made to FIGS. 3*a*-3*g* which illustrate the method of repairing a headliner in a motor vehicle. FIG. 3*a* illustrates a gap G that is present between the headliner H and the pillar trim panel P. In order to address this issue, the trim pillar panel P is removed to uncover the points where the headliner is connected to the pillar block pins BP of the motor vehicle (see FIG. 3*b*).

Next one inspects the headliner H identifying any locator tab T on the headliner that is torn, deformed or damaged and does not properly engage with a pillar block pin BP. This is followed by the cutting of any locator tab T so identified from the headliner H (see FIG. 3*c*).

Figure 3D:
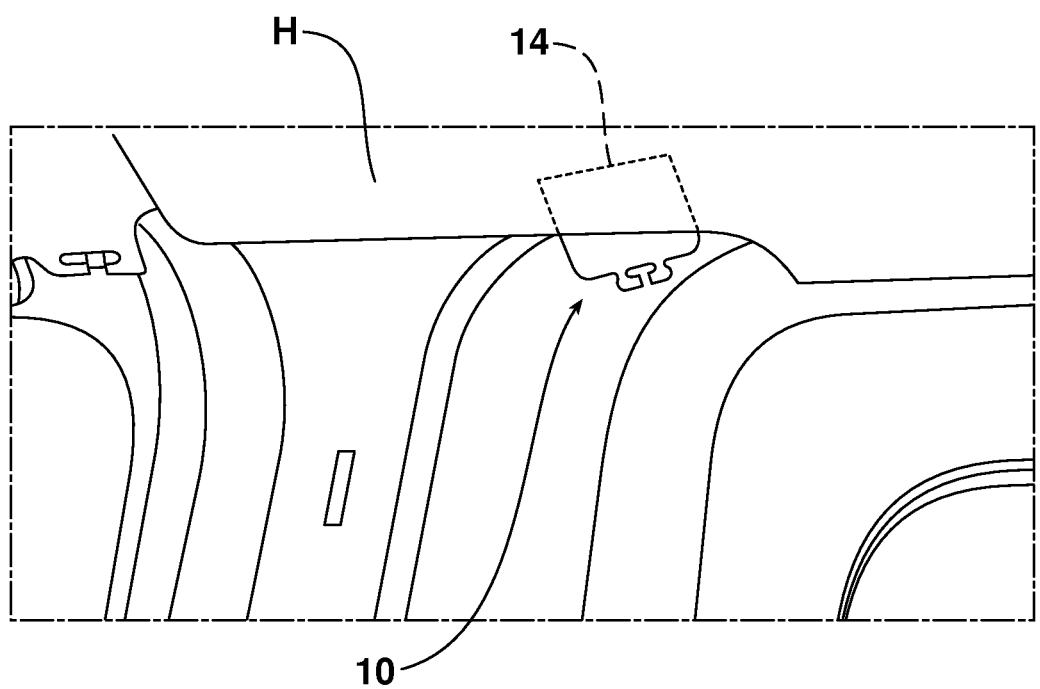
Figure 3E:
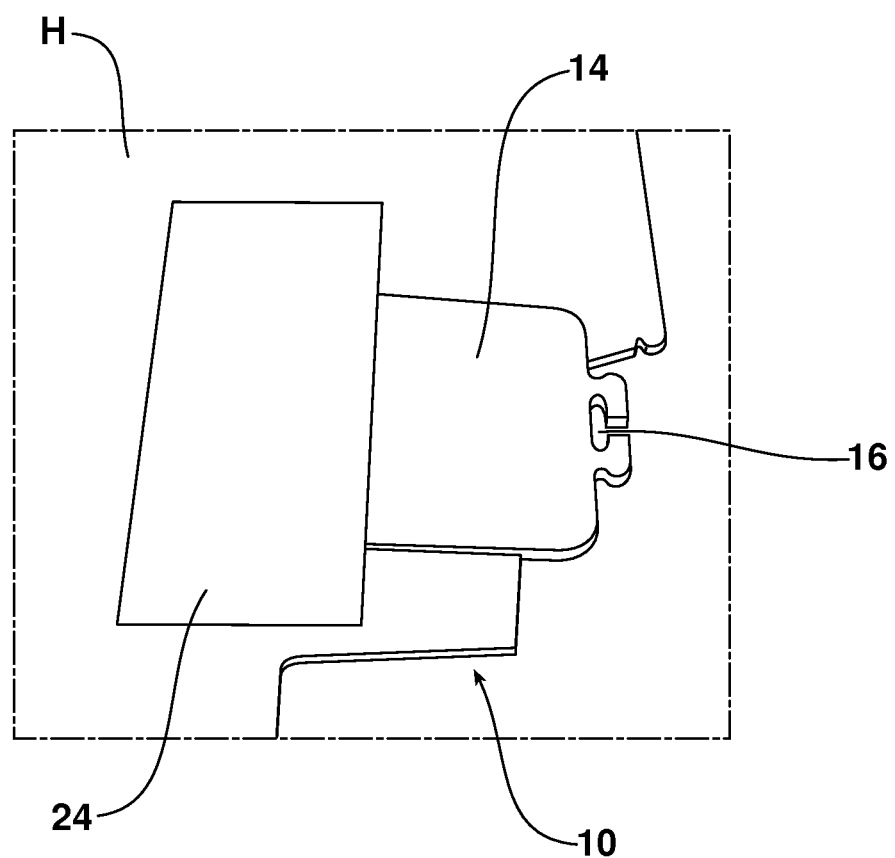

Next comes the step of connecting the new or replacement locator tab 10 to the headliner H. As best illustrated in FIGS. 1*a*, 3*d* and 3*e*, this is done by removing the protective film 22 from the adhesive film 18 on the face 20 of the headliner mounting portion 14 of the replacement locator tab 10. With the face 20 pointed downward, the replacement locator tab 10 is carefully positioned behind the headliner H and the locator portion 12 is aligned with the pillar block pin BP so that the pillar block pin is centered in the keyhole opening 16. The headliner is then gently moved outboard so that the edges are within three to five mm of the body side of the sheet metal. Once the headliner H is aligned in the correct position, one works fingers behind the headliner H and firmly presses the replacement locator tab and headliner together for approximately 15 seconds until good adhesion is achieved between the mounting portion 14 and the headliner.

For many applications it is then desired to further secure the connection of the replacement tab 10 to the headliner H utilizing a tape strip 24. That tape strip 24 is firmly placed over the mounting portion 14 of the replacement locator tab 10 on the back side of the headliner while ensuring that the strip fully covers the edges of the mounting portion as illustrated in FIG. 2*e*. This tape strip 24 functions to eliminate the step or surface discontinuity the replacement 10 creates on the backside of the headliner H and mitigates the possibility of the air curtain catching on the edge during deployment. Of course, the tape strip 24 also functions to secure the tab 10 to the headliner H body.

Figure 3F:
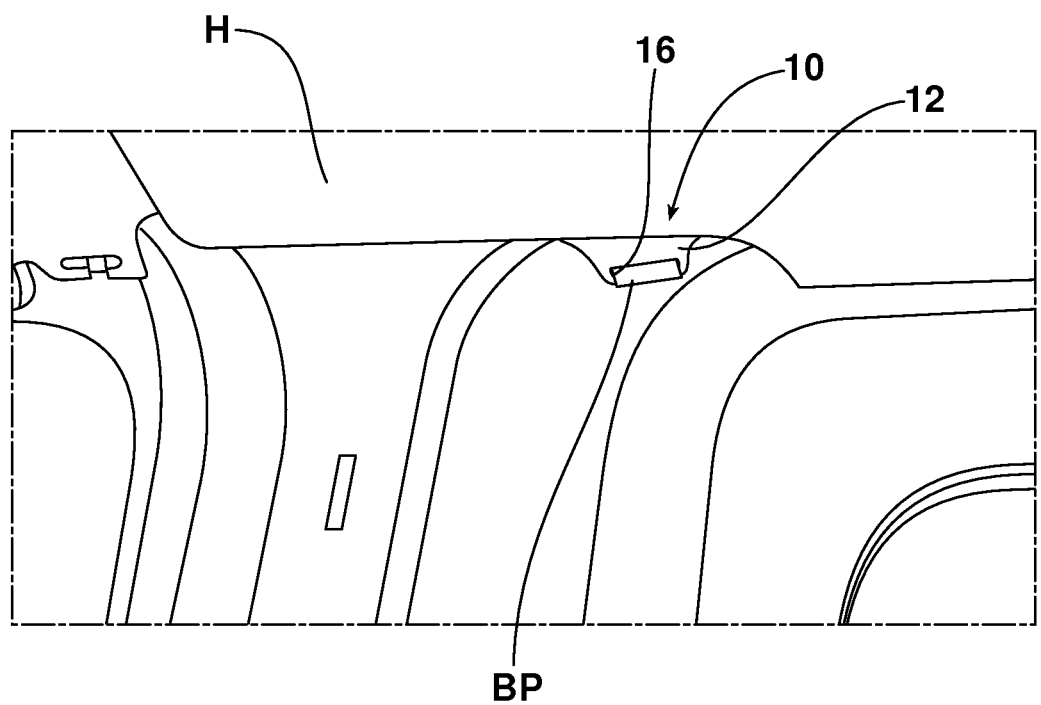
Figure 3G:
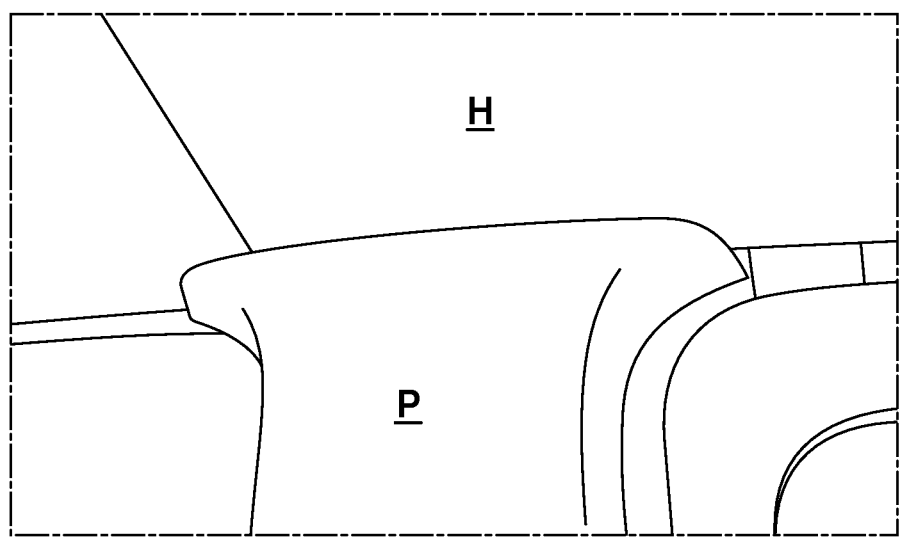

Next, one confirms that the locator portion 12 of the replacement locator tab 10 is properly secured to the pillar block pin BP. See FIG. 3*f* illustrating the pillar block pin BP extending through the keyhole opening 16 in the locator portion 12. This is then followed by the replacing of the trim pillar panel P thereby completing the repair process and eliminating the gap G between the headliner H and the pillar trim panel P. See FIG. 3*g*.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A replacement locator tab for a headliner, comprising:
   a locator portion and a headliner mounting portion, wherein the locator portion and the headliner mounting portion are co-planar;
   an adhesive film on a face of said headliner mounting portion; and
   a removable protective film overlying said adhesive film.

2. The replacement tab of claim 1, wherein said locator portion and headliner mounting portion are made from cross-linked polyethylene.

3. The replacement tab of claim 2, wherein said adhesive film is a butyl adhesive film.

4. The replacement tab of claim 1, wherein said adhesive film is a butyl adhesive film.

5. A headliner for a motor vehicle, comprising:
a headliner body; and
a locator tab secured to said headliner body, said locator tab including a locator portion having a keyhole opening, a headliner mounting portion and an adhesive film on a face of said headliner mounting portion securing said locator tab to said headliner body.

6. The headliner of claim 5, wherein said locator portion and said headliner mounting portion are made from cross-linked polyethylene.

7. The headliner of claim 6, wherein said adhesive film is a butyl adhesive film.

8. The headliner of claim 5, wherein said adhesive film is a butyl adhesive film.

9. The headliner of claim 5, further including a tape strip overlying said mounting portion of said locator tab and helping secure said locator tab to said headliner body.

10. A method of repairing a headliner in a motor vehicle, comprising:
cutting a locator tab from said headliner;
connecting a new locator tab to said headliner; and
securing said new locator tab to a pillar block pin of said motor vehicle.

11. The method of claim 10, wherein connecting a new locator tab to said headliner includes securing said new locator tab to said headliner by an adhesive.

12. The method of claim 11, further including securing said new locator tab to said headliner with a tape strip.

13. The method of claim 12, including identifying any locator tab on said headliner that is torn, deformed or damaged and does not properly engage with a pillar block pin and cutting any locator tab so identified from said headliner.

14. The method of claim 13, including replacing all cut locator tabs with a new locator tab.

15. The method of claim 11, including aligning said new locator tab with a pillar block pin of said motor vehicle before connecting said new locator tab to said headliner.

16. The method of claim 15, including removing a protective film from an adhesive film covering a mounting portion of said new locator tab before adhering said new locator tab to said headliner.

17. The method of claim 16, including removing a trim pillar panel so as to uncover said locator tab of said headliner.

18. The method of claim 17, including replacing said trim pillar panel after securing said new locator tab to said pillar block pin of said motor vehicle.

\* \* \* \* \*